United States Patent [19]

Zimmer et al.

[11] 4,119,698

[45] Oct. 10, 1978

[54] RECLAMATION TREATMENT OF RED MUD

[75] Inventors: Erich Zimmer, Jülich, Germany; Ahmad Nafissi, Tehran, Iran; Günther Winkhaus, Königswinter, Germany

[73] Assignees: Kernforschungsanlage Jülich, Gesellschaft mit beschränkter Haftung, Julich; Vereinigte Aluminum-Werke Aktiengesellschaft, Bonn, both of Germany

[21] Appl. No.: 884,014

[22] Filed: Mar. 6, 1978

Related U.S. Application Data

[63] Continuation-in-part of Ser. No. 854,078, Nov. 23, 1977, abandoned.

[30] Foreign Application Priority Data

Nov. 26, 1976 [DE] Fed. Rep. of Germany ....... 2653762

[51] Int. Cl.² .................. C01G 23/06; C01F 7/06
[52] U.S. Cl. ........................ 423/82; 423/85; 423/119; 423/128; 423/131; 423/146; 423/199; 423/208
[58] Field of Search .................. 423/82, 85, 119, 128, 423/131, 146, 150, 199, 208

[56] References Cited

U.S. PATENT DOCUMENTS

| 2,398,425 | 4/1946 | Haff | 423/85 |
| 2,402,668 | 6/1946 | Roller | 423/128 |
| 2,551,944 | 5/1951 | Haff | 423/128 |
| 2,830,892 | 4/1958 | Udy | 423/82 |
| 3,295,924 | 1/1967 | Colombo | 423/85 |
| 3,311,449 | 3/1967 | Atsakawa et al. | 423/82 |

FOREIGN PATENT DOCUMENTS

45-17894  6/1970  Japan ......................... 423/85

*Primary Examiner*—Brian Hearn
*Attorney, Agent, or Firm*—William R. Woodward

[57] ABSTRACT

The red mud by-product of the Bayer process by which aluminum oxide is removed from bauxite as an aluminate, is digested with concentrated sulfuric acid or with sulfur trioxide gas to produce sulfates that can be leached out to the resulting mass with water. The solution is then heated at a pH of 1 to precipitate titanium oxide hydrate by hydrolysis. The remaining sulfates of the solution are then obtained in solid form by evaporation, or by precipitation with acetone, and the solid is then roasted to convert the aluminum and iron to the oxide. After leaching out the sodium sulfate with water, the aluminum and iron oxide are separated by the Bayer process, which works in this case even though x-ray diffusion patterns show that the aluminum oxide is mainly $\alpha Al_2O_3$.

2 Claims, 1 Drawing Figure

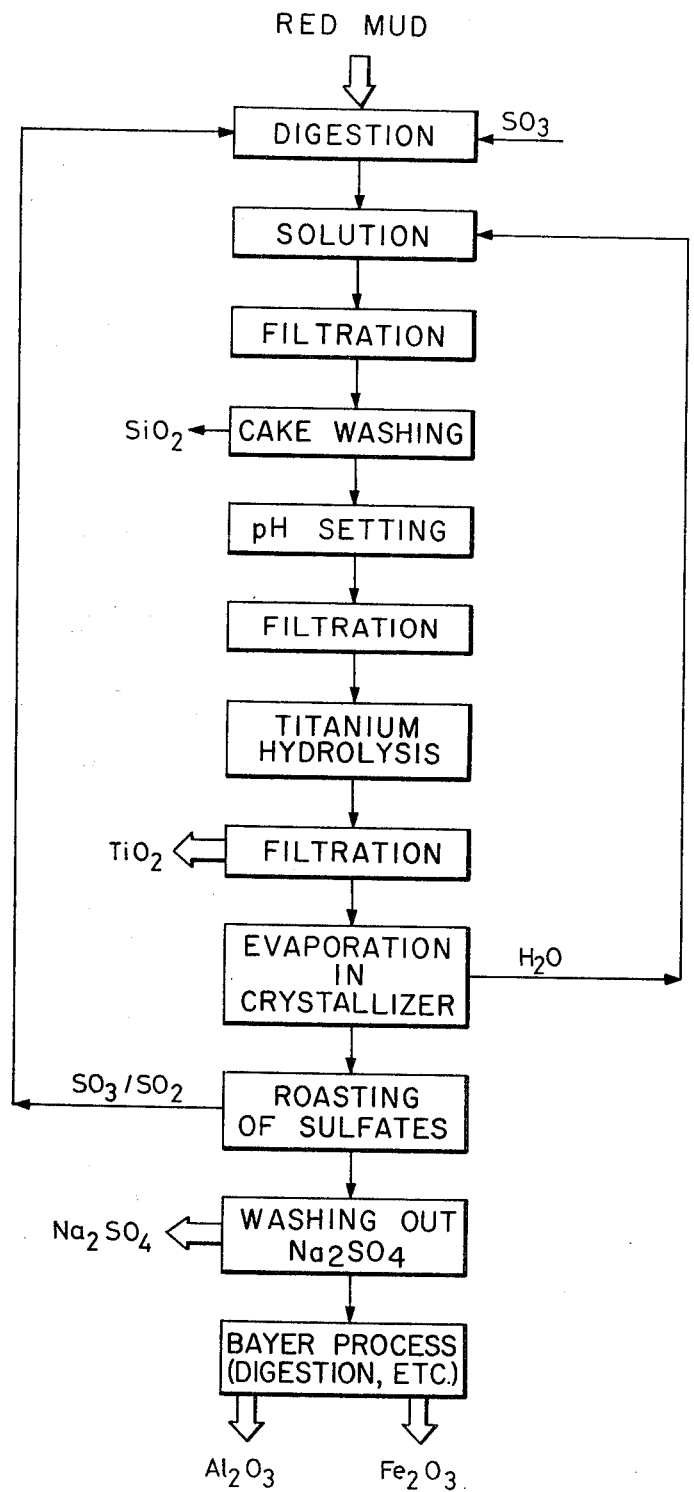

RECLAMATION TREATMENT OF RED MUD

This application is a continuation-in-part of our application Ser. No. 854,078, filed Nov. 23, 1977, now abandoned.

This invention relates to a process for treatment of the red mud by-product of the usual treatment of bauxite for obtaining aluminum oxide, in order to recover useful materials therefrom.

Bauxite, a sedimentary oxide ore of variable composition, containing principally the oxides of aluminum, iron, silicon, and titanium, is a principal raw materal for production of aluminum oxide.

Digestion of the bauxite with sodium hydroxide after the well-known Bayer process selectively dissolves out the amphoteric aluminum oxide as aluminate, which is subsequently further treated to produce aluminum oxide, which is for example a starting material for the production of aluminum by electrolysis of a melt (using molten cryolite as the solvent). The fine-grained residue formed in the Bayer process contains, besides other oxides, also $Fe_2O_3$ and is therefore red in color, for which reason it is known as red mud. Red mud usually has the following composition, in terms of the dry material.

By weight:
$Al_2O_3$: 22 – 39%
$Fe_2O_3$: 20–38%
$TiO_2$: 7 – 25%
$SiO_2$: 7 – 15%
$NaO_2$: 6 – 11%
$CaO$: 1 – 2%
hot drying loss ($H_2O$ etc.): 8 – 12%

Although the high aluminum, iron and titanium content suggests utilization of the red mud as a secondary ore, a suggestion that has not failed to lead to experiments to extract one or another element according to the raw materials situation, red mud is mainly disposed of as a waste product of aluminum production in large dumps. This requires a large amount of expense.

It is accordingly an object of the invention to provide a process in which red mud can be treated and the useful components contained in the red mud can be made available for technical use. The process to be provided should accordingly be capable of practice in an economical way without being overbalanced by the use of other chemicals and without producing a new waste product noxious to the environment.

The Present Invention

Briefly, the red mud is soaked after heating to produce soluble sulfates of aluminum, iron and sodium which are subsequently separated in further steps of the method. More particularly, while the red mud is heated to a temperature in the range between 250° and 350° C concentrated sulphuric acid is added or sulphur trioxide is introduced in such a quantity that after a reaction time of at most 1 hour the principal metals present, aluminum, iron, titanium, sodium and calcium, are mostly present as sulfates, after which the soluble sulfates are leached out with water from the mass thus formed and the resulting solution is separated from the solid residue consisting essentially of silicon dioxide and gypsum by filtering off or decantation. The pH value of the solution then obtained is adjusted to about 1.0, corresponding to a temperature of 20° C, after which titanium oxide hydrate is hydrolytically precipitated at a temperature of at least 90° C and is thereafter separated from the solution by filtering off or by decantation, or both. The remaining solution is then vaporized and the sulfates are crystallized by drawing off water, or the solution is mixed with acetone for precipitating the sulfates and the sulfate precipitate from the acetone-water mixture is separated out. Of course it is possible in this step to do some evaporation and then to make the precipitate by the admixture of acetone. The solid sulfates are then heated to the range of 900° to 1000° C in order to decompose the sulfates of aluminum and iron and to form the corresponding oxides with the giving off of a gas mixture consisting of $SO_3$ and $SO_2$. The unaffected sodium sulfate is then leached out with water and thereby separated from the ovides and brought into the solution. The oxides of aluminum and iron which remain in the solid state after the leaching out of the sodium sulfate are then separated from each other by the known Bayer process.

BRIEF DESCRIPTION OF THE DRAWING

For tne case in which after the hydrolysis of the titanium oxide the remaining solution is vaporized in a crystallizer, the process of the invention is illustrated in the flow diagrams shown in the single FIGURE of the annexed drawing.

DESCRIPTION OF THE PROCESS

The first step of the process is digestion of the red mud with a powerful sulfating agent, either by addition of concentrated sulphuric acid or by introduction of sulphur trioxide gas. Of course in each case suitable procedures must be performed for sufficiently mixing the sulfating agent with the red mud, as for example by mechanical stirring. It has been found advantageous to carry out this conversion of the red mud with concentrated sulphuric acid or with sulphur trioxide gas at a temperature lying in the region between 280° and 320° C. Under such conditions an almost complete digestion of the oxide is obtained. The digestion can usefully be carried out, however, at somewhat lower and higher temperatures, particularly by temperatures in the range between 250° and 350° C. Of course sulfur trioxide and $H_2SO_4$ can both be used.

After leaching out the soluable sulfates, the solid residue, silicon dioxide (sand) mixed with some gypsum is a waste product that presents no problems or risks to be avoided for the sake of the environment or to find a useful application of the material (for example as a filling material).

If after the carrying out of the sulfating step and the subsequent leaching and filtration step the solution obtained does not already have a pH value of about 1, the prescribed process step of adjusting the pH value can be carried out in a variety of ways. A procedure that is simple to carry out is to add sodium hydroxide to the solution, forming additional soluble sodium sulfate. In such case, however, the using up of sodium hydroxide must be considered as a cost of the process. Consequently, it can also be useful, instead of adding sodium hydroxide, to add quicklime or slaked lime (CaO or $Ca(OH)_2$). The additive in such a case is cheap, but a result is that gypsum is precipitated and must be separate. If it is desired to avoid the formation not only of additional sodium sulfate but also gypsum, it is, further, possible, to add moist red mud to the solution in order to bring the pH to the value necessary for the hydrolysis of the titanium oxide. The undissolved portion of the added red mud can then be separated by a suitable method of separating solid from liquid (settling and decantation, filtration, etc.).

The process step of adjusting the pH value must as a practical matter describe the acidity of the solution at a specified temperature, since the degree hydrolysis and thereby the pH value depends upon the temperature of the solution. Consequently in the case of this particular step, the pH value should be adjusted so that at a temperature of 20° C it lies at about 1. At 40° C one would accordingly measure the pH of about 0.8. By this adjustment optimum conditions for titanium hydrolysis are produced. Of course, the pH value could also be set in terms of measurements at some temperature other than 20° or 40° C if the variation of the pH value with temperature over the temperature range in question is known with sufficient precision.

As can be seen from the flow diagram illustrated in the drawing, the water driven off by evaporation of the solution can be used for leaching out the sulfates and, likewise, the mixture of $SO_3$ and $SO_2$ produced by roasting of the sulfates can be used again for digesting red mud, in this case the mixture of sulphur oxides being brought into contact with the suitable catalyst in order to produce pure sulphur trioxide. It is of course also possible, in case the red mud is digested by the addition of concentrated sulfuric acid, to lead the sulphur trioxide, produced by catalysis from the sulphur oxides driven off in the roasting step, into water in order to form concentrated sulfuric acid for use in the digestion step.

The aluminum oxide remaining after the last leaching step, in which the sodium sulfate is removed from the mixture of aluminum and iron oxides, has surprisingly been found to a high degree soluble by the application of the Bayer process ore separation from the iron oxide. This result was not to be expected, because x-ray diffraction patterns showed that the aluminum oxide was present mainly as α aluminum oxide was not technically digestable by the known Bayer process without the use of extreme temperatures. The aluminum oxide resulting from the present process, however, it amenable to successful treatment by the Bayer process without resort to such extreme temperatures.

EXAMPLE I

The starting material was 1 kg of red mud of the following composition:
$Al_2O_3$: 34.5% By weight
$Fe_2O_3$: 21.3% By weight
$SiO_2$: 14.7% By weight
$Na_2O$: 9.5% By weight
$TiO_2$: 7.2% By weight
CaO: 1.1% By weight
hot drying loss ($H_2O$ etc.): 11.1% By weight In order to digest this quantity of red mud there are stoichiometrically required 1.8 kg of concentrated $H_2SO_4$ (98% by weight). For the digestion 2.5 kg $H_2SO_4$ were actually used, which corresponds to an excess of 40%. The digestion was carried out at a temperature of about 300° C in a glass vessel. Both the vapors of the sulphuric acid and also the water formed by the reaction could get out through a glass tube at the head of this vessel and were then trapped in a suitable annex for re-use. About ⅔ of the excess acid was regained in this manner. The digestion was carried on about 1½ hour.

After the digestion the reaction product was leached out with 5 liters of water. The analysis of the residue and of the solution produced the following extraction ratios:
$Al_2O_3$: 91%
$Fe_2O_3$: 83%
$TiO_2$: 86%
$Na_2O$: 100%

The solution was then adjusted to a pH value of 1.0 at 22° C by the addition of fresh red mud. The undissolved portion of the red mud was immediately filtered off. Then, by heating the solution to the boiling point, with reflux cooling, titanium oxide hydrate was hydrolytically precipitated, 97% of the titanium being obtained that way in 5 hours. Only 5% of the iron was precipitated out with it, whereas no substantial quantity of the remaining components could be found in the precipitate.

The solution remaining after the precipitation of the titanium was evaporated until only solid material remained. This material was a mixture of hydrated sulfates of aluminum, iron and sodium. The mixture of these sulfates was slowly heated up to 900° C, slowly in order to prevent strong spattering. After this treatment the sulfates of aluminum and iron were converted into the oxides with $SO_3$ splitting off. $Na_2SO_4$ remained unaffected in this treatment and was completely washed out of the mixture of $Al_2O_3$ and $Fe_2O_3$ with a water wash.

Thereafter the two oxides were separated from each other by a Bayer digestion process, although an x-ray diffraction pattern showed that the oxide that was the predominant aluminum oxide phase was $Al_2O_3$. A previously prepared sodium hydroxide solution was used for the Bayer process digestion just as is used for digestion of bauxite. The concentration of the sodium hydroxide solution was:

161 grams/liter $Na_2O$, of which 136 g./l. is free $Na_2O$, together with 71 grams/liter $Al_2O_3$.

The ratio of the number of moles of free soda lye to moles of $Al_2O_3$ accordingly was 3.15. By mixing in 3.6 liters of this lye on the oxide mixture residue (about 310 g $Al_2O_3$) 95% of the $Al_2O_3$ could be digested at 265° C and 50 bar in 15 minutes.

EXAMPLE II

In this case the first digestion step was performed by gaseous $SO_3$. The $SO_3$ was made available by warming "oleum" (solution of $SO_3$ in concentrated $H_2SO_4$). 1 kg of red mud of the same composition as in Example I was predried at 300° C before further treatment. $SO_3$ was then brought into contact with the red mud at 330° C. The reaction products in this step were contained in a glass vessel having a double bottom. The inner bottom was composed of a glass frit to which $SO_3$ could enter into the reaction space. The red mud was agitated continuously with a rotary stirrer during the digestion. As in the case of digestion with $H_2SO_4$ the gas ($SO_3$) leaving the reaction chamber was led away through a glass tube and recycled through the reaction chamber.

The digestion results were:
$Al_2O_3$: 81%
$Fe_2O_3$: 87%
$TiO_2$: 96%
$Na_2O$: 100%

After the digestion the sulfates were subjected to further treatment in the same way as described in Example I.

EXAMPLE III

The process was carried out with the same materials and in the same way as in Example I down to the separation of the titanium. The separation of the sulfates of iron, aluminum and sodium as solids out of the solution was obtained in this case, however, by the addition of acetone. To about 5 liters of aqueous solution that remained after the separation of the precipitated titanium 5 liters of acetone were added. Solid salts separated out. Along with that precipitate two liquid phases were formed, one containing essentially acetone (60% by volume), constituting the upper phase and to a large extent salt-free, and the other an aqueous salt-rich lower phase with small acetone content. The solid was then filtered away. Immediately thereafter the liquid salt-rich phase was combined with a fresh solution in which, after the hydrolytic precipitation of the titanium, the precipitation of the sulfates by means of acetone was to be formed. The acetone-rich phase was subjected to a distillative separation of the acetone. Acetone could be used again for the precipitation and the aqueous solution remaining at the bottom could be used for the leaching of a new digestion product.

The further treatment of the salts after their separation was performed as in the case of Example I. Since in the case of precipitation with acetone the salts precipitated out were to a large extent free from water of crystallization (hydrate water), the application of heat was simpler. Even with quick heating no spattering of the salts occurred as was observed in the case of quick heating of hydrated salts.

Although the invention has been described with reference to particular illustrative examples, it is evident that variations and modifications are possible within the inventive concept.

We claim:

1. A process for treatment of the red mud residue of the Bayer process extraction of aluminum from bauxite comprising the steps of:
   (a) heating the red mud to a temperature in the range of 250° to 350° C and then sulfating it with addition of a substance selected from the group consisting of concentrated sulfuric acid and sulfur trioxide, and mixtures of sulfuric acid and sulfur trioxide in such quantity that after a reaction time of at most one hour the principal red mud metallic components, aluminum, iron, titanium, sodium and calcium are present mainly as sulfates;
   (b) then leaching the sulfates with water out of the mass formed in the previous step, to produce a sulfate solution, and separating the solution from the solid residue consisting largely of $SiO_2$;
   (c) then adjusting the pH to a value corresponding to approximately 1.0 at 20° C, and thereafter heating the solution to a temperature of at least 90° C to form titanium oxide hydrate by hydrolysis and then separating the latter;
   (d) then separating the sulfates from the water of the remaining solution by either evaporating the water or by adding acetone to precipitate sulfate from an acetone-water mixture or both;
   (e) then roasting the sulfates at a temperature in the range of 900° to 1000° C to decompose the sulfates of aluminum and iron by giving off a mixture of $SO_2$ and $SO_3$ and forming the corresponding oxides;
   (f) then dissolving the sodium sulfate by leaching it out with water and thereby separating it from the oxides of iron and aluminum, and
   (g) separating the residual oxides of aluminum and iron from each other by the Bayer process.

2. A process for treatment of the red mud residue of the Bayer process extraction of aluminum from bauxite as defined in claim 1 in which the first step of heating and sulfating the red mud is carried out at a temperature in the range of 280° to 320° C.

* * * * *